July 19, 1960
H. C. MAY ET AL
2,945,690
CONTROL VALVE DEVICE FOR VEHICLE AIR SPRINGS
Filed Feb. 27, 1956
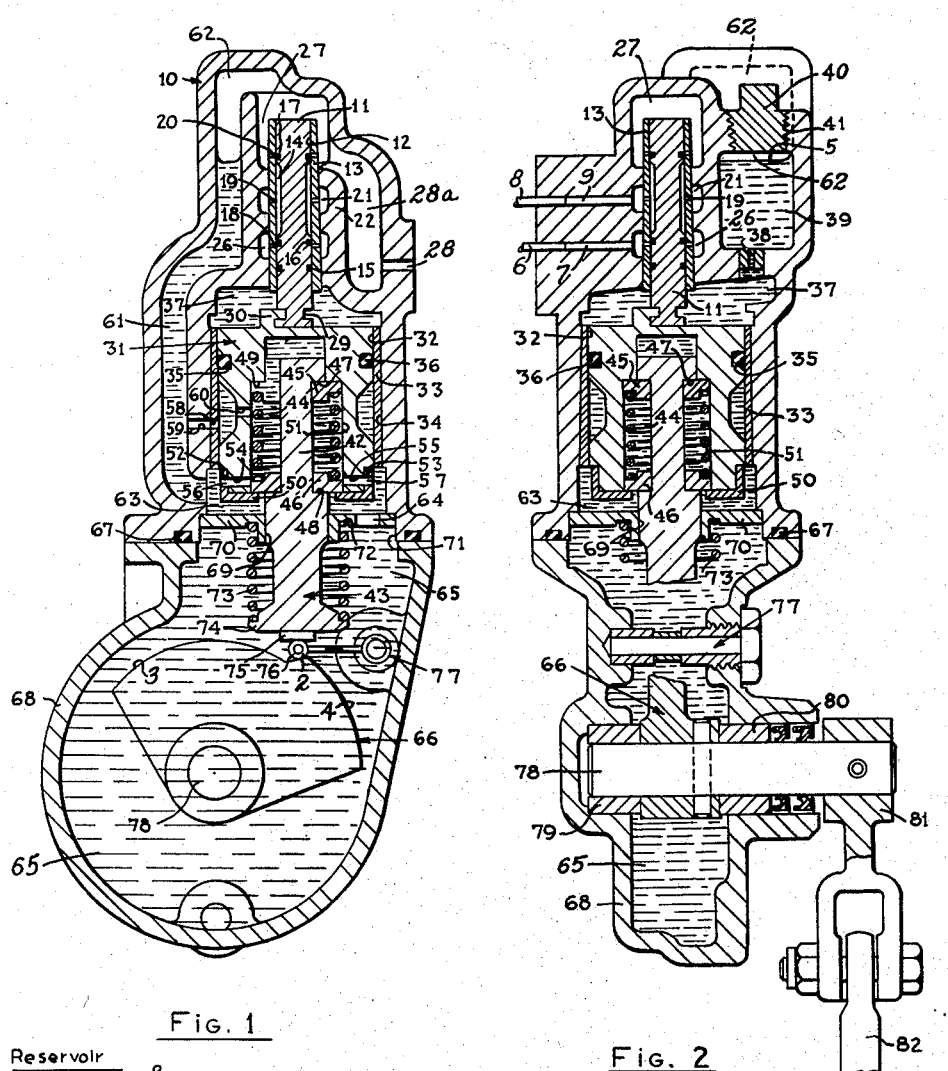
Fig. 1
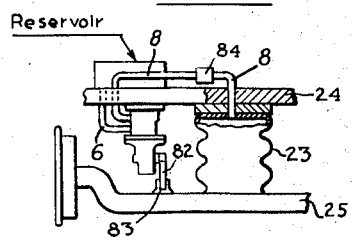
Fig. 3
Fig. 2
*INVENTOR.*
Harry C. May
BY  Joseph F. Frola
ATTORNEY United States Patent Office 2,945,690
Patented July 19, 1960

2,945,690

CONTROL VALVE DEVICE FOR VEHICLE AIR SPRINGS

Harry C. May, East McKeesport, and Joseph F. Frola, Braddock, Pa., assignors to Westinghouse Air Brake Company, Wilmerding, Pa., a corporation of Pennsylvania Filed Feb. 27, 1956, Ser. No. 568,113

4 Claims. (Cl. 267—65)

This invention relates to control valve devices for vehicle air springs, and more particularly to control valve devices operated by relative movement between sprung and unsprung parts of a vehicle to so regulate the pressure in the air springs as to maintain a substantially constant level of the vehicle body notwithstanding variations of load carried by the vehicle.

Pressure regulating valve devices for vehicle air springs have been heretofore known or proposed which recognize the problem of continual vertical oscillation of the vehicle body due to road shock under travel conditions and which provide means for dampening out such high frequency oscillatory movements as may tend to be transmitted to the regulating valve, so as to cause the regulating valve to operate to adjust the pressure in the air springs only intentionally in response to changes in load carried by the vehicle.

Such prior regulating valve devices have however been characterized by such construction that undue wear of actuating parts of the regulating valve device occurs incident to the continual vehicle body oscillations caused by road shock during travel, which as a consequence results in a relatively short service life of these valve devices.

It is the primary and general object of the present invention to provide a novel control valve device of the aforesaid type for regulating the pressure in vehicle air springs, characterized in that it is capable of much longer service life than has hitherto been possible of attainment by the control valve device heretofore known.

In accord with the above general object, the novel air spring pressurization control valve device constructed according to the present invention embodies a housing filled with oil in which the parts of the valve actuating mechanism are disposed. Friction and wear of these parts is kept to a minimum due to the lubrication and cooling effect afforded by their intimate association with the volume of oil in surround of same. Still further, relative to prior art devices, the device of the present invention embodies a simplified arrangement of fewer components, nearly all of which are disposed in direct line relationship for movement in a common direction, thereby contributing to extended service life of such device by the reduction in the number of parts relied upon for successful operation and the reduction in friction forces on such parts by virtue of their simple linear motion.

The novel control valve device includes hydraulic dampening means employing oil of the same type as that with which the housing is filled for surround of the valve operating mechanism, and port and passage means are provided in such housing which enable such oil to be introduced thereinto via a single filler port.

Other objects and advantages will become apparent after a study of the accompanying drawings, in which:

Fig. 1 is a cross-sectional view in a first vertical plane through a valve constructed according to the preferred embodiment of the invention;

Fig. 2 is a partial cross-sectional view through a second vertical plane; and

Fig. 3 is a view, in reduced scale, showing a suitable arrangement for mounting the valve on the vehicle.

Whereas for convenience of illustration only the embodiment of the invention is shown in which the valve body is mounted on the vehicle body and the lever is operatively connected to the unsprung axle, it should be understood that, if desired, the valve body could be mounted on the truck or axle and the operating lever coupled to the vehicle body, suitable resilient air connections being provided.

Particular reference should be made now to the drawings in which like reference characters are used throughout to designate like parts, and in particular to Figs. 1 and 2 thereof.

The valve apparatus is disposed within a valve housing generally designated by the reference numeral 10, Fig. 1. A spool type valve element 11 is slidably disposed in a bore 12 in a bushing 13. The valve element 11 has an undercut portion of reduced diameter 14, and a plurality of sealing elements 15, 16, and 17 disposed on both sides of the undercut portion. The aforementioned bushing 13 has disposed therein at spaced intervals groups of valve ports 18, 19 and 20, the ports 18 and 20 being adapted to be selectively and alternately connected with port 19 by way of the aforementioned undercut portion 14, depending upon the longitudinal position of the valve element 11 in the bushing 13, for reasons to be hereinafter more fully apparent. The aforementioned valve ports 19 communicate with a chamber 21 in an inner section 22 of the aforementioned valve housing 10, and the chamber 21 is connected by a casing port 9 and a conduit 8 to an air spring such as for example the air spring 23, Fig. 3, which supports the bottom 24 of the car body on an unsprung axle or truck 25, for regulating the height of the car body above the axle despite variations in the load on the body.

Whereas for convenience of illustration only one air spring supporting the vehicle body is shown, it is to be understood that each axle may have two air springs near the two ends thereof respectively, or may have one air spring centrally located on the axle or truck.

The aforementioned valve ports 18 communicate with a chamber 26 in the aforementioned inner portion of the housing 22, the chamber 26 being connected by means of a port 7 and a conduit 6 to a source of fluid under pressure, such for example as the reservoir of compressed air, Fig. 3. The aforementioned valve ports 20 communicate with a cavity 27 in the valve housing 10 which is connected to atmosphere by suitable means, such for example as a passage 28a and a port 28 and preferably a vent protector of any convenient design (not shown).

The aforementioned spool type valve element 11 is provided at the lower end thereof as viewed in Fig. 1 with a portion 29 of reduced diameter which is adapted to be engaged by an actuator member 30 in the form of a U-shaped hook provided on one end of a dampening piston generally designated 31. The piston 31 is slidably disposed in a bore 32 in a second bushing 33 which is itself pressed or otherwise mounted in a large bore 34 in the aforementioned housing or casing 10.

The piston 31 has at least one annular groove 35 on the outside thereof for receiving a sealing ring 36. The upper end of the piston 31 cooperates with the casing wall to form a lower dampening oil chamber 37 which is connected through a restricted port such as a choke 38, Fig. 2, to an upper dampening oil chamber 39 in the casing 10, the dampening oil chamber 39 being disposed above dampening oil chamber 37. This construction permits upward movement of the piston 31 to slowly displace oil from the lower oil chamber 37 through the choke 38 to the upper chamber 39 and to provide a time delay in a manner hereinafter to be more fully apparent. Downward movement of the piston 31 is retarded due to the tendency to create a vacuum in the lower dampening oil chamber 37 until oil can flow from the upper chamber 39 through the choke 38 and fill the lower chamber 37. The extreme upper portion of upper dampening oil chamber 39 communicates, in a manner to be more fully described hereinafter, with cavity 27 open to atmosphere by way of passage 28a and port 28, so that atmospheric pressure on the oil in chamber 39 will force oil through choke 38 when movement of piston 31 downward tends to create a partial vacuum in chamber 37. As will be apparent hereinafter, the connection between chamber 39 and cavity 27 is such that oil does not flow from chamber 39 into cavity 27.

The dampening oil chamber 39 may be filled by removing a threaded plug 40 which is shown in Fig. 2 in threaded engagement with a threaded filler port 41 in the top of the casing 10.

The aforementioned piston 31 is resiliently connected by a caged spring assemblage to an operating stem 42 of a cam-following pusher element generally designated 43, the assemblage including a helical spring 44 disposed around stem 42 between two spring plates or collars 45 and 46 slidably mounted on member 42 between two stop portions of enlarged diameter or flanges formed on the operating stem and which provide shoulders 47 and 48. Collars 45 and 46, annular in shape, may be of the split variety so that they may be slipped or sprung on the stem 42. The spring 44 normally forces the collars 45 and 46 in opposite directions against the two shoulder stops 47 and 48 and while piston 31 is in its normal position, also against stop surface 49 and stopping ring 50 disposed at opposite ends of the bore 51 in piston 31, in which bore the aforementioned members 45 and 46 are slidably disposed. Stop surface 49 is the shoulder of a bore portion of smaller diameter, as shown and ring 50 provides a corresponding spaced shoulder. The aforementioned stop member 50 is a cup-shaped member having therein small apertures or bores 52 and 53 which are disposed in substantial alignment with small apertures or bores 54 and 55 respectively in the aforementioned piston 31 for receiving the pins 56 and 57 respectively for holding the cup-shaped stop member 50 on the end of the piston 31.

Preferably the bushing 33 has a port 58 therein in registry with a port 59 in the inner wall of the valve housing, and preferably the piston 31 has a bore 60 therein, as shown, to permit the free flow of lubricating oil from a conduit 61 into the mechanism inside piston 31. The upper end of conduit 61 opens into an upper chamber 62 which is in communication with chamber 39 via a spillover port 5 (Fig. 2) so that when the valve is filled with oil, a portion of the oil flows from chamber 39 to chamber 62 and thence down passage 61 for lubricating the entire valve apparatus. Oil normally flows from conduit 61 through the open area 63 and port 64 into a lower cam chamber 65 in which a cam generally designated 66 and hereinafter to be more fully described is located, the flow of oil as described hereinabove providing lubrication for all moving surfaces of the valve actuating apparatus. An O-ring seal 67 is provided between the lower portion 68 of the valve housing 10 and the upper portion to prevent the leakage of oil at this joint between the portions of the valve apparatus.

Referring to the drawing, in summary, it will be apparent from the foregoing description that the housing 10 is filled with oil initially by removal of the plug 40 and introducing such oil directly into the dampening chamber 39 via the filler port 41, from which chamber such oil will flow via the choke 38 into the lower dampening oil chamber 37, and, by spilling over from chamber 39 via the port 5 into chamber 62 of conduit 61, such oil will flow downwardly through said conduit 61, area 63 and port 64 into the cam chamber 65 to fill same in surround of the cam 66 and associated elements to be described subsequently. After the filling of cam chamber 65, by continued supply of oil to passage 61 via chamber 39 such oil will be made to rise therein and flow laterally therefrom via the ports 58 and 59 into encirclement of the stem 42 and in surround of the spring 44 to fill these and other voids with oil for cooling and lubrication of all sliding parts, including the piston 31, the upper end of stem 42, collars 45 and 46, stem 43 etc. Such introduction of oil via filler port 41 into the dampening oil chamber 39 will be terminated preferably when such oil begins to rise within such filler port, this act serving to indicate that the housing 10 has been provided with an adequate amount of oil.

This upper end of the chamber 62 extends upwardly to a level well above the outer opening of the filler port 41 and is in constant communication with the upper open end of cavity 27 which is also above the outer opening of the filler port 41. It will thus be seen that while the oil from chamber 39 may flow to chamber 62, it can never rise sufficiently high in chamber 62 to spill over into cavity 27.

It will be seen also that atmospheric pressure is constantly active on the oil in the housing 10 including that in chamber 39 by reason of the connection of the top of chamber 62 with the atmosphere via the top of cavity 27 which is constantly open to the atmosphere via the passage 28a and the port 28.

The lower portion of the cam following pusher element 43 which is formed intgerally with stem portion 42 extends through a bore 69 in an annular disc-like member or bottom plate 70, which is securely mounted in a bore 71 in the valve housing 10. The plate member 70 has an annular groove 72 therein for receiving one end of a helical spring 73, the other end of the spring 73 being engaged by collar 74 near the bottom of the pusher element 43, the spring 73 biasing the end 75 of the pusher element 43 into engagement with a cam dog or roller 76 disposed between the end 75 of pusher element 43 and the aforementioned cam 66, the cam dog 76 being suitably pivotally mounted as at the mounting generally designated 77. The cam 66 is fixedly mounted upon a rotatable shaft 78 which is journalled in suitable bearings 79 and 80, Fig. 2, in the oil-filled lower portion 68 of the valve housing. One end of the shaft 78 extends beyond the bearing 80, Fig. 2, and has mounted thereon and secured thereto one end of a lever 81. The other end of the lever 81 is pivotally connected as shown in Fig. 2 to one end of a link 82 which has the other end thereof anchored at 83 to the aforementioned unsprung axle or truck 25, Fig. 3.

Referring to Fig. 1 in the drawing, according to a novel feature of the invention, it will be seen that the cam 66 comprises two surfaces 3 and 4, each of a different but constant radius, joined by a sloping surface 2. The rise of the sloping cam surface 2 is limited to that necessary to cause effective movement of the relatively short travel spool type valve element 11, while the constant radius cam sections 3 and 4 when presented to the roller 66 provide for overtravel of the cam 66 resultant from momentary excessive variations in air spring supported height of the vehicle without increased displacement of roller 76, pusher element 43 etc. The inclusion of such novel cam 66 in conjunction with related short travel components, is a feature of the invention which contributes to the durability and long service life of the novel air spring pressurization control valve device as herein set forth.

In the operation of the above-described apparatus, movement of the sprung car body relative to the unsprung axle or truck 25 due to changes in load on the bottom of the body 24 will, by way of link 82, lever 81, and shaft 78, effect rotation of the cam 66 and thereby, by way of pusher element 43, stem 42, and piston 31, will effect displacement of the valve element 11 in an upward or downward direction depending on the direction of rotation of the cam 66. The cam 66 and valve 11 are shown in neutral position in Fig. 1, that is, the ports 19 connected to the air spring or bellows 23 are not connected to either supply or atmosphere. It is to be understood that the valve and linkage are so mounted and arranged that decreases in the distance between axle 25 and body 24 tend to rotate the cam 66 in a clockwise direction, Fig. 1, and increases in the distance between the axle 25 and body 24 tend to rotate the cam 66 in a counterclockwise direction, Fig. 1.

Assume now by way of description that cam 66 rotates in a counterclockwise direction, moving pusher element 43 and stem follower 42 upward. Shoulder 48 moves collar 46 upward, compressing spring 44 and tending to exert upward pressure on collar 45 and, since the shoulder 47 has been moved upward and away from collar 45, thence on shoulder 49 to move piston 31 upward, but as a result of the dash pot action of choke 38 between the chambers 37 and 39, the piston 31 cannot move as fast as the operating stem 42. Therefore spring 44 is compressed to permit stem 42 to move upward relative to piston 31. As oil flows out of chamber 37 through choke 38, piston 31 will follow the movement of stem 42 and move upward thereby moving the valve spool element 11 upward to connect ports 19 and 20 by way of undercut portion 14 so that fluid under pressure is released from the bellows or air spring 23, in accordance with reduction in the load on the body of the car.

As air is exhausted from the bellows or air spring 23, the latter correspondingly collapses, thus lessening the distance between axle 25 and body 24, and cam 66 rotates in a clockwise direction, until it reaches the position shown in Fig. 1. The pressure of biasing spring 73 forces pusher element 43 and stem 42 downward. The shoulder 47 of the portion of enlarged diameter of stem 42 forces collar 45 downward, compressing spring 44 against collar 46 which presses against cup member 50 attached to piston 31, tending to move piston 31 downward. However, movement of piston 31 downward tends to create a vacuum in chamber 37, and only after a time delay, when sufficient oil has flowed through choke 38 from chamber 39 into chamber 37 does piston 31 complete its downward movement, carrying valve element 11 to its neutral position whereat ports 19 communicating with the air spring 23 are connected to neither the source of supply nor to atmosphere.

Assume now by way of description that the load on body 24 is increased, reducing or tending to reduce the distance between body 24 and axle 25, and causing cam 66 to rotate in a clockwise direction from the neutral position shown in Fig. 1, in which the instant height of the cam at the point of contact with roller 76 is such that the pusher element 43 and valve element 11 assume positions whereat the air spring is connected neither to the source nor to atmosphere. Spring 73 forces pusher element 43 and stem 42 to move downward still further. Shoulder 47 of the enlarged upper portion of stem 42 forces collar 45 downward, compressing spring 44 which presses against collar 46 which presses against cup member 50 attached to piston 31 by pins 56 and 57. The aforementoined vacuum effect in chamber 37 prevents piston 31 from instantly following the downward movement of pusher element 43 and stem 42, but after a time delay determined by the rate of flow of oil through choke 38, piston 31 completes its total movement downward, carrying valve element 11 downward and interconnecting ports 18 and 19 by way of undercut portion 14, admitting air from the source of air under pressure to the bellows or air spring 23, tending to move body 24 upward, and tending to rotate cam 66 in a counterclockwise direction. When the cam 66 reaches the position shown in Fig. 1, the valve 11 is returned to the aforementioned neutral position, by an operation of the valve mechanism similar to that hereinbefore described.

It will be seen, then, that the distance between body 24 and axle 25 is maintained substantially constant irrespective of increases or decreases of load, at a distance determined by the angular setting of cam 66.

The invention contemplates the use of one or more biased check valves to prevent the pressure in the air spring from falling below a predetermined minimum value. A check valve (not shown) may be located in the conduit communicating with atmosphere, or a check valve 84 may be located in the conduit which communicates between the valve and the bellows or air spring 23, Fig. 3.

It is contemplated that any convenient means of machining, forming, or mounting the various parts of the apparatus, or joining parts together, may be employed.

Having now described the invention, what we claim as new and desire to secure by Letters Patent is:

1. A control device comprising a casing providing one chamber containing hydraulic fluid and a second chamber, flow-restricting means interposed between said chambers for controlling the rate of displacement of fluid therebetween, one longitudinally movable element the longitudinal position of which is to be controlled, piston means operatively connected to said one element for controlling the position thereof, said piston means having one side exposed to pressure of fluid in said second chamber and having at the opposite side a recess providing axially spaced shoulders, a follower element arranged coaxially with said piston means and projecting into said recess and having two outwardly directed flanges, a spring and a pair of spring plates surrounding said follower element, said spring plates normally being spread axially by said spring such that each of said plates engages a respective one of said flanges and shoulders, said follower element being axially movable by a control force relative to said piston for operatively compressing said spring, and said piston means thereupon being operative by the power stored in said spring to displace hydraulic fluid from either one of said chambers to the other of said chambers at the rate controlled by said flow-restricting means until said piston means and thereby said one element have assumed positions corresponding to the longitudinal position of said follower element whereby rapid change of position of said follower element will produce a corresponding but slower change of position of said one element.

2. The combination as claimed in claim 1, further including rotatable cam means for controlling axial movement of said follower element and comprising a sloping surface joining two curved surfaces of different constant radii respectively, said cam means having a neutral position in which said follower element engages said sloping surface of said cam means at approximately the midpoint thereof, and being rotated in one direction or the opposite direction from said neutral position to cause said follower element to be shifted axially to a corresponding position, and resulting in shifting of said one element in one direction or the opposite direction corresponding to the direction of rotation of said cam means.

3. For use in a system for controlling the pressure of fluid in an air spring, interposed between a sprung portion and an unsprung portion of a vehicle, so as to cause the air spring to support the sprung portion at a substantially constant preselected height relative to the unsprung portion irrespective of the load carried by the sprung portion, and utilizing lever means controlled by vertical movement of the sprung portion relative to the unsprung portion and operative to a normal position when the sprung portion is at the preselected height: a control valve device comprising casing means having two chambers containing hydraulic fluid, flow-restricting means interconnecting said two chambers, reciprocable valve means having a lap position for retaining fluid under pressure in the air spring, a supply position for supplying fluid under pressure to the air spring, and a release position for exhausting fluid under pressure from the air spring, a dampener piston disposed in said casing means and arranged coaxially with said valve means and connected to the latter means, said dampener piston being exposed at one side to the pressure of hydraulic fluid in one of said chambers and having at the opposite side a coaxially arranged recess providing axially spaced shoulders, rotatably oscillatable cam means connected to and operable by the lever means and having a neutral position corresponding to the normal position of the lever means, cam follower means arranged coaxially with said dampener piston and having one end provided with two spaced outwardly directed flanges disposed within said recess of said dampener piston and the opposite end cooperating with said cam means and being reciprocable in response to oscillation rotatably of said cam means, a pair of annular spring plates mounted between said outwardly directed flanges on said one end of said cam follower means, and spring means surrounding said one end of said cam follower means in interposed relation between said annular spring plates, said spring means biasing said spring plates in opposite directions into contact with the corresponding spaced shoulders of said recess to correspondingly position the said dampener piston when said cam means is in said neutral position, and being compressed by movement of said follower means responsively to rotary movement of said cam means for shifting said dampener piston at a rate controlled by displacement of fluid from either one of said chambers to the other of said chambers through said flow-restricting means, thus delaying the movement of said valve means in relation to said follower means to said supply or release position respectively, the increase or decrease of pressure of fluid in the air spring thus effected causing the sprung portion of the vehicle to assume the preselected height and thereby returning the lever means to its normal position and incidentally effecting rotation of said cam means to its said neutral position.

4. A control valve device, as claimed in claim 3, wherein the cam means is provided with two curved surfaces of different radii respectively connected by a sloping surface and wherein additional spring means are provided for biasing said follower means into abutting contact with the sloping surface on said cam means.

References Cited in the file of this patent

UNITED STATES PATENTS

| | | |
|---|---|---|
| 1,005,713 | Killin | Oct. 10, 1911 |
| 1,498,226 | Beck | June 17, 1924 |
| 1,512,805 | Roucka | Oct. 21, 1924 |
| 2,020,847 | Mitereff | Nov. 12, 1935 |
| 2,109,459 | Best | Mar. 1, 1938 |
| 2,297,418 | Koller | Sept. 29, 1942 |
| 2,646,072 | Sebald | July 21, 1953 |
| 2,670,201 | Rossman | Feb. 23, 1954 |